(12) United States Patent
Duerr

(10) Patent No.: US 9,011,716 B1
(45) Date of Patent: Apr. 21, 2015

(54) WHITE FLUORESCENT BLENDED DYE FOR LEAK DETECTION

(75) Inventor: John Duerr, Massapequa Park, NY (US)

(73) Assignee: Spectronics Corporation, Westbury, NY (US)

( * ) Notice: Subject to any disclaimer, the term of this patent is extended or adjusted under 35 U.S.C. 154(b) by 0 days.

(21) Appl. No.: 12/905,748

(22) Filed: Oct. 15, 2010

Related U.S. Application Data

(60) Provisional application No. 61/251,888, filed on Oct. 15, 2009.

(51) Int. Cl.
*C09K 11/06* (2006.01)
*C09B 59/00* (2006.01)

(52) U.S. Cl.
CPC ............. *C09B 59/00* (2013.01); *Y10S 252/96* (2013.01); *Y10S 252/964* (2013.01)

(58) Field of Classification Search
USPC ............. 252/301.16, 301.19, 302, 960, 964, 252/301.21, 79.1, 79.4; 436/3, 56; 422/68.1, 82.05; 106/31.14, 31.15, 106/31.32, 31.64; 8/400, 524, 648
See application file for complete search history.

(56) References Cited

U.S. PATENT DOCUMENTS

| | | | |
|---|---|---|---|
| 4,326,981 A | 4/1982 | Molina | |
| 4,362,645 A | 12/1982 | Hof et al. | |
| 4,758,366 A | 7/1988 | Parekh | |
| 5,149,453 A | 9/1992 | Parekh | |
| 5,250,708 A | 10/1993 | Barry, Jr. | |
| RE36,951 E | 11/2000 | Cooper et al. | |
| 6,165,384 A * | 12/2000 | Cooper et al. | ............ 252/301.19 |
| 6,327,897 B1 * | 12/2001 | Scaringe et al. | ............... 73/40.7 |
| 2001/0050532 A1 * | 12/2001 | Eida et al. | ...................... 313/504 |
| 2005/0019934 A1 * | 1/2005 | Duerr | .............................. 436/56 |
| 2008/0230738 A1 * | 9/2008 | Minor et al. | .................... 252/67 |
| 2010/0058837 A1 * | 3/2010 | Quest et al. | ....................... 73/40 |
| 2011/0095232 A1 * | 4/2011 | Mahany | .................. 252/301.36 |

OTHER PUBLICATIONS

Bright Dyes Products—Web site materials dated Jul. 28, 2003—2 pgs.—www.brightdyes.com.
Bright Dyes—Technical Data Bulletin—Water Tracing Dye—FLT Yellow/Green Products (dated at least Jul. 28, 2003).
Bright Dyes—Technical Data Bulletin—Water Tracing Wax Products (dated at least Jul. 28, 2003).
Bright Dyes—Technical Data Bulletin—Water Tracing Dye—Standard Blue Products (dated at least Jul. 28, 2003).

* cited by examiner

Primary Examiner — Carol M Koslow
Assistant Examiner — Lynne Edmondson
(74) Attorney, Agent, or Firm — Drinker Biddle & Reath LLP

(57) ABSTRACT

The present invention provides a white-fluorescing dye blend comprising at least one neutral blending oil, a perylene-based compound, naphthalimide-based compound, and a coumarin-based compound. This white-fluorescing dye blend has a substantial fluorescent response to illumination by the entire range of commonly available inspection lamps. The resultant blended dye is an all-purpose blend that is satisfactory for all automotive fluids and all inspection lamps.

9 Claims, No Drawings

WHITE FLUORESCENT BLENDED DYE FOR LEAK DETECTION

FIELD OF THE INVENTION

This invention relates, generally, to the field of leak detection by illumination of fluorescent material, and more particularly to fluorescent dye compositions utilized in leak detection.

BACKGROUND OF THE INVENTION

In order to detect leaks in fluid systems, fluorescing dyes can be added to the fluid. The dyes become activated (i.e., fluoresce) when exposed to UV or high energy (short wavelength) blue visible light. Fluorescent additives enable targeted leak detection capable of determining the site of leakage of an operating fluid from a working system. Operating fluids such as lubricants, hydraulic fluids, heat transfer fluids, and refrigerants can all be treated with a dye additive which fluoresces when illuminated by suitable ultraviolet or visible blue light.

One such dye is the TP-3900 engine coolant dye sold by Spectronics Corporation, Westbury, N.Y., which fluoresces green when exposed to UV or high energy blue visible light. Blue water-based fluorescing dyes are also available for coolants or other fluid systems.

Fluorescence is generally understood to be a property that enables certain materials to absorb light energy and radiate visible light at a longer wavelength than the absorbed light. According to generally accepted theory, electrons in fluorescent materials are excited upon being illuminated by light energy of a specific wavelength, and light energy of a longer wavelength is radiated from these materials as the electrons return to the unexcited or ground state. The specific excitation and radiation wavelengths are characteristics of the particular fluorescent materials. The apparent brightness of a fluorescent material's luminescence is dependent on the wavelength emitted by the material and the intensity of the incident radiation that excites the material. For example, a fluorescent dye which has its excitation peak at a specific wavelength may quickly emit a much reduced luminescence as the wavelength of incident light deviates from the excitation peak, and will lose the ability to fluoresce when the incident light does not have enough energy within the specific excitation range.

The visibility of the fluorescent response is much increased when the intensity of other visible light is reduced, so that the fluorescent response is not masked or washed-out by other light. Thus, ultraviolet/blue leak detection lamps directed in otherwise dark conditions at an operating system containing a UV/blue responsive fluorescent dye will reveal leak sites which glow against the dark background.

Typical automotive fluids encompass a wide range of physical properties and include air conditioning refrigerant, engine lubricating oil, transmission fluid, brake fluid, power steering fluid, radiator coolant, diesel oil, and gasoline. In an auto repair facility, where diagnostic leak detection using fluorescent dyes is commonly performed on both air conditioning and other fluid systems, there is generally only one inspection lamp available for leak detection purposes. This light source may not be optimally, or even altogether, effective on the dye in the target fluid.

It would therefore be desirable to have a fluorescent dye for the various types of working fluids which is effective in all automotive working fluids, and which can be activated by the types of UV or high energy blue visible light lamps that are available in typical automotive repair facilities.

SUMMARY OF THE INVENTION

The present disclosure provides a white-fluorescing dye blend. In certain embodiments, the white-fluorescing dye blend comprises a mixture of a yellow dye solution, a blue dye solution, and a green dye solution.

In certain embodiments, the white-fluorescing dye blend further comprises at least one neutral blending oil.

In certain embodiments, the yellow dye solution comprises between about 24 to about 45 weight % of the white-fluorescing dye blend, the blue dye solution comprises between about 12 to about 40 weight % of the white-fluorescing dye blend, and the green dye solution comprises from about 1% to about 28 weight % of the white-fluorescing dye blend.

In certain embodiments, the yellow dye solution comprises a yellow fluorescing perylene-based compound, the blue dye solution comprises a blue fluorescing coumarin-based compound, and the green dye solution comprises a green fluorescing naphthalimide-based compound.

In certain embodiments, the white-fluorescing dye blend further includes a red dye solution.

In a particular embodiment, the yellow dye solution comprises about 34 weight % of the white-fluorescing dye blend; the blue dye solution comprises about 22 weight % of the white-fluorescing dye blend; the green dye solution comprises about 11 weight % of the white-fluorescing dye blend; and the neutral blending oil is not optional and comprises about 33 weight % of the white-fluorescing dye blend.

In some embodiments, the yellow dye solution comprises a yellow fluorescing perylene-based compound, the blue dye solution comprises a blue fluorescing coumarin-based compound, and the green dye solution comprises a green fluorescing naphthalimide-based compound.

The present invention further provides a white-fluorescing dye blend comprising at least one neutral blending oil, a blue fluorescing coumarin-based compound, a green fluorescing naphthalimide-based compound, and a yellow fluorescing perylene-based compound.

In certain embodiments, the white-fluorescing dye blend further comprises a red-fluorescing compound.

The present invention further includes a method of preparing a white-fluorescing dye blend, the method comprising blending a yellow dye solution, and a blue dye solution, and a green dye solution.

In certain embodiments, method further comprises blending a neutral blending oil.

In certain embodiments of the method described herein, the yellow dye solution comprises about 34 weight % of the white-fluorescing dye blend, the blue dye solution comprises about 22 weight % of the white-fluorescing dye blend, the green dye solution comprises about 11 weight % of the white-fluorescing dye blend, and the neutral blending oil comprises about 33 weight % of the white-fluorescing dye blend.

DETAILED DESCRIPTION

Definitions

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

Many leak detection dyes are available in primary or secondary colors. Most common are blue-green and yellow, and less frequently and much more expensively, red. Applicant has determined that by blending such dyes, additional colors can be created that otherwise would not exist. Additionally, the fluorescent response of commonly used dyes can be enhanced by the addition of a small amount of a different color dye. For example, there are many dyes that will fluoresce blue. These dyes can be enhanced to emit a brighter blue by the addition of a green fluorescing dye. The resulting dye blend provides a brighter blue response that is much more easily seen. Since green dye is usually also less costly than blue dye, the resulting product is not only enhanced but is less expensive than the unblended blue dye itself. Some such mixtures are disclosed in commonly owned U.S. application Ser. No. 10/848,396, which is incorporated by reference herein in its entirety.

Thus, dye blending can be used to enhance existing colors for leak detection or to create entirely new fluorescent dyes having color responses that would otherwise be impossible or impractical. Dye blends are provided to create alternative colored leak detection for detecting leaks in various fluid systems. Differently colored leak detection dyes are particularly useful when multiple systems are piped in close proximity. By using a differently colored dye in each fluid system within a device, service personnel can more readily determine which system is leaking and can thus avoid shutting down multiple systems in order to perform a repair on only one system.

Common UV/blue fluorescent leak detection and non-destructive testing dyes used today include perylene-based fluorescent dyes and naphthalimide-based fluorescent dyes. For example, yellow perylene-based dyes produce an intense yellow fluorescent response when exposed to incident radiation in a band of the electromagnetic spectrum which includes the long wave ultraviolet (UV-A) wavelength range of about 315 nm to about 400 nm, with a strong peak between about 340 to 375 nm. Long-wave ultraviolet is also referred to as "black light", as it includes a small segment of the visual violet range. Yellow perylene-based dye is typically provided as a dye solution comprising a yellow fluorescing perylene-based compound and an oil, with the yellow fluorescing perylene-based compound comprising from about 17 to about 50 weight % of the dye solution.

Green naphthalimide-based dyes fluoresce a brilliant green when exposed to incident radiation of visible violet/blue light. The visible violet/blue range extends from about 400 nm to about 480 nm within the electromagnetic spectrum. Green naphthalimide-based dye is typically provided as a dye solution comprising a green fluorescing naphthalimide-based compound and an oil, with the amount of green fluorescing naphthalimide-based compound ranging from about 30 to about 60 weight % of the dye solution. Yellow perylene-based dyes and green naphthalimide-based dyes are useful for leak detection in oil-based working fluids or fluids in which oil is miscible.

Coumarin-based dyes fluoresce in a variety of colors, including blues, greens, reds, and oranges when excited with light in the range of about 365 nm to about 450 nm. For purposes of the present invention, blue fluorescing coumarin-based dyes are preferred. Blue coumarin-based dye is typically provided as a dye solution comprising the blue coumarin-based dye and an oil, with the amount of blue coumarin based-dye ranging from about 15 to about 35 weight % of the dye solution.

In one embodiment of the present invention, an economical and useful blend can be formed by combining multiple dye solutions to form a white-fluorescing dye blend. A white fluorescent response in a leak detection dye is desirable because it is easily seen. Further, very few chemical compounds naturally fluoresce white, which reduces the possibility of false leak indications.

The white-fluorescing dye blend with bright fluorescence has been created by blending three dye solutions—a blue dye solution (i.e., a dye solution comprising a blue fluorescing coumarin-based compound), a green dye solution (i.e., a dye solution comprising green fluorescing naphthalimide-based compound), and a yellow dye solution (i.e., a dye solution comprising a yellow fluorescing perylene-based compound). By appropriately proportioning these dye solutions, a bright white response has been obtained. In other words, a bright white-fluorescing dye can be produced without the need to blend in a costly red dye solution. The cost of production can be further reduced by blending the white-fluorescing dye blend with a neutral blending oil. The neutral blending oil, when blended in an appropriate ratio, only moderately affects the intensity of fluorescence (brightness) and enables the preparation of a larger volume of material without incurring the costs associated with producing an equivalent volume of pure dye blend.

In one formulation, a white-fluorescing dye blend can be made using from about 24% to about 45 weight % of a yellow dye solution, from about 12% to about 40 weight % of a blue dye solution, and from about 1% to about 28 weight % of a green dye solution. Variation of the percentage of a given dye solution in the formulation provides the ability to adjust the color fluorescence to be more or less bluish, greenish, or reddish.

Although tending to make the white-fluorescing dye more expensive, the above described formulation can include up to about 20 weight % of a red dye solution in certain embodiments. The red dye solution can be added to the yellow, blue, and green dye solution mixture to further refine the brightness and shade of white fluorescence. Alternatively, or additionally, the formulation can include a neutral blending oil.

In another formulation, a white-fluorescing dye blend can be made using from about 29 to about 39 weight % of a yellow dye solution, about 17 to about 27 weight % of a blue dye solution, and from about 6 to about 16 weight % of a green dye solution, with the neutral blending oil making up the remainder.

In a particular formulation, a bright white-fluorescing dye blend can be produced using about 34 weight % of a yellow dye solution, about 22 weight % of a blue dye solution, about 11 weight % of a green dye solution, and about 33 weight % of a neutral blending oil.

Although any blue, yellow, red, or green fluorescing dye solutions can be used for the preparation of the white-fluorescing dye described herein, for the purposes of leak detection in a fluid system, it is preferable to select dye solutions wherein the oil in the solution is an inert oil. For example, an inert oil is one that will not swell, or only minimally swell, any polymeric components in a given system. Similarly, an inert oil will have a neutral or near neutral pH so as not to corrode any metallic components found in a given system. It is within the ability of the ordinarily skilled artisan to select dyes formulated in appropriately inert oils from amongst the various possible commercially available dye solutions.

The neutral blending oil should likewise be an inert oil. Examples of inert oils include, but are not limited to mineral oil, light petroleum hydrocarbon, polyalkylene glycol, polyvinyl ether, polyalpha olefin, alkyl benzenes, and polyester synthetic lubricants.

Although in certain embodiments, a white-fluorescing dye blend can be prepared by mixing appropriate amounts of the above described dye solutions, in certain embodiments, the white-fluorescing dye blend can be prepared by mixing at least one neutral blending oil with a blue fluorescing coumarin-based compound, a green fluorescing naphthalimide-based compound, and a yellow fluorescing perylene-based compound, In certain embodiments, a red-fluorescing compound can be included as well.

It is within the ability of the ordinarily skilled artisan to determine the appropriate amounts of fluorescing compounds to add to a given volume of neutral blending oil based on the disclosure provided herein.

EXAMPLES

The white-fluorescing dye blends disclosed herein are now further detailed with reference to the following examples. These examples are provided for the purpose of illustration only and the white-fluorescing dye blends disclosed herein should in no way be construed as being limited to these examples but rather should be construed to encompass any and all variations which become evident as a result of the teaching provided herein.

The white-fluorescing dye blends shown in Table 1 were prepared using yellow, blue, green, and red fluorescing dye solutions. A neutral blending oil was also included in certain examples. All values given in Table 1 are in weight %.

TABLE 1

| Dye Solution Color | Blend 1 | Blend 2 | Blend 3 | Blend 4 | Blend 5 |
|---|---|---|---|---|---|
| Blue | 27 | 40 | 30 | 33 | 22 |
| Green | 27 | 22 | 28 | 22 | 11 |
| Yellow | 27 | 25 | 35 | 45 | 34 |
| Red | 19 | 13 | 7 | 0 | 0 |
| Neutral Blending Oil | N/A | N/A | N/A | N/A | 33 |

Various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A white-fluorescing dye blend for inclusion in a working fluid for detecting sites of fluid leakage, the dye blend adapted to produce a substantially white fluorescence when excited with ultraviolet or blue light, the white-fluorescing dye blend comprising a mixture of a yellow fluorescing dye solution which fluoresces yellow when exposed to the ultraviolet or blue light, a blue fluorescing dye solution which fluoresces blue when exposed to the ultraviolet or blue light, and a green fluorescing dye solution which fluoresces green when exposed to the ultraviolet or blue light, wherein the yellow fluorescing dye solution comprises between about 24 to about 45 weight % of the white-fluorescing dye blend, the blue fluorescing dye solution comprises between about 12 to about 40 weight % of the white-fluorescing dye blend, and the green fluorescing dye solution comprises from about 1% to about 28 weight % of the white-fluorescing dye blend.

2. The white-fluorescing dye blend of claim 1, wherein said white-fluorescing dye blend further comprises at least one neutral blending oil.

3. The white-fluorescing dye blend of claim 1, wherein the yellow fluorescing dye solution comprises a yellow fluorescing perylene-based compound, the blue fluorescing dye solution comprises a blue fluorescing coumarin-based compound, and the green fluorescing dye solution comprises a green fluorescing naphthalimide based compound.

4. The white-fluorescing dye blend of claim 1, further comprising a red fluorescing dye solution which fluoresces red when exposed to the light.

5. The white-fluorescing dye blend of claim 1, wherein
the yellow fluorescing dye solution comprises about 34 weight % of the white-fluorescing dye blend;
the blue fluorescing dye solution comprises about 22 weight % of the white-fluorescing dye blend;
the green fluorescing dye solution comprises about 11 weight % of the white-fluorescing dye blend; and
at least one neutral blending oil comprising about 33 weight % of the white-fluorescing dye blend.

6. The white-fluorescing dye blend of claim 4, wherein the yellow fluorescing dye solution comprises a yellow fluorescing perylene-based compound, the blue fluorescing dye solution comprises a blue fluorescing coumarin-based compound, and the green fluorescing dye solution comprises a green fluorescing naphthalimide based compound.

7. A method of preparing the white-fluorescing dye blend of claim 1, said method comprising blending a yellow fluorescing dye solution, a blue fluorescing dye solution, and a green fluorescing dye solution.

8. The method of claim 7, further comprising blending a neutral blending oil.

9. A method of preparing a white-fluorescing dye blend for inclusion in a working fluid for detecting sites of fluid leakage, the white-fluorescing dye blend comprising a mixture of a yellow fluorescing dye solution, a blue fluorescing dye solution, and a green fluorescing dye solution, said method comprising blending a yellow fluorescing dye solution, a blue fluorescing dye solution, a green fluorescing dye solution, and a neutral blending oil;
wherein the yellow fluorescing dye solution comprises about 34 weight % of the white-fluorescing dye blend, the blue fluorescing dye solution comprises about 22 weight % of the white-fluorescing dye blend, the green fluorescing dye solution comprises about 11 weight % of the white-fluorescing dye blend, and the neutral blending oil comprises about 33 weight % of the white-fluorescing dye blend.

* * * * *